United States Patent [19]
Chateau

[11] Patent Number: 5,295,287
[45] Date of Patent: Mar. 22, 1994

[54] METHOD AND INSTALLATION FOR THE ON-LINE PRODUCTION OF A PLY OF ASSEMBLIES AND THE WINDING THEREOF ON A BEAM

[75] Inventor: Fernard Chateau, Pont Du Chateau, France

[73] Assignee: Compagnie Generale des Establissements Michelin - Michelin & Cie, Clermont-Ferrand Cedex, France

[21] Appl. No.: 59,174

[22] Filed: May 5, 1993

Related U.S. Application Data

[63] Continuation of Ser. No. 775,718, Oct. 11, 1991, abandoned.

Foreign Application Priority Data

Oct. 29, 1990 [FR] France .................. 90 13503

[51] Int. Cl.[5] ......................................... D02H 5/00
[52] U.S. Cl. ........................... 28/187; 28/190; 57/58.3; 57/81
[58] Field of Search .................. 28/186, 187, 190; 57/58.3, 58.32, 58.34, 58.36, 58.38, 81, 313

[56] References Cited
U.S. PATENT DOCUMENTS

| | | | |
|---|---|---|---|
| 1,935,242 | 11/1933 | Falton | 28/190 |
| 2,458,555 | 1/1949 | Bouvet | 28/187 |
| 2,967,947 | 1/1961 | Flook | 28/190 X |
| 4,592,119 | 6/1986 | Bauer et al. | 28/271 |
| 4,604,862 | 8/1986 | McGettigan et al. | 57/264 |
| 4,644,622 | 2/1987 | Bauer et al. | 28/271 |
| 4,689,942 | 1/1987 | Chateau | 57/58.36 |
| 4,789,008 | 6/1988 | Kikuchi | 57/90 X |
| 4,941,240 | 7/1990 | Denzler et al. | 28/187 |
| 4,976,018 | 12/1990 | Bollen | 28/187 |

Primary Examiner—Joseph J. Hail, III
Attorney, Agent, or Firm—Brumbaugh, Graves, Donohue & Raymond

[57] ABSTRACT

A method and installation (1) for the on-line production of a ply (21) of assemblies (20) of threads (30, 40) and the winding thereof on a beam (29). A plurality of rotary devices (2) permitting the production of the assemblies (20) is used to obtain the ply (21); the ply (21) is driven along by pulling elements (23) common to all the assemblies (20); elements (32) which permit the synchronizing of the speeds of the devices (2) and of the elements (23) are used; the ply (21) is wound on the beam (29); elements (33) which permit the detection of a defect (35) in the ply (21) are used. Beams (29) obtained by this method or with this installation.

4 Claims, 3 Drawing Sheets

METHOD AND INSTALLATION FOR THE ON-LINE PRODUCTION OF A PLY OF ASSEMBLIES AND THE WINDING THEREOF ON A BEAM

This application is a continuation of application Ser. No. 07/775,718, filed on Oct. 11, 1991, now abandoned.

BACKGROUND OF THE INVENTION

The present invention relates to methods and installations which make it possible to produce assemblies of textile threads.

The expression "thread" is to be understood in a very broad sense. A thread may be a "single thread" formed of one or more filaments. When the single thread is formed of a single filament, it is referred to as a "monofilament" and when the single thread is formed of several filaments, it is called a "multifilament". A thread may, furthermore, itself be an assembly of single threads.

An assembly of threads is referred to as a "plied yarn" when it is formed of a plurality of single threads twisted together by a single twist and an assembly of threads is referred to as a "cabled yarn" when it is formed of several threads at least one of which is a plied yarn which are combined together by one or more twists.

Such assemblies are used, for instance, in order to reinforce articles of plastic and/or rubber, such articles being, for instance, belts, hoses and tires.

One known method for the manufacture of textile assemblies comprises several successive operations, which can be divided into two main families:

- the operations of assembling textile threads; these operations can be carried out in one step with, for instance, a direct cabling method or in several steps, for instance, by first of all preparing twisted multifilaments which are then assembled in order to obtain plied yarns; the assemblies are thus obtained in the form of bobbins;
- a warping operation, by unwinding a number of bobbins of assemblies in order to wind them on a beam.

This method has the following drawbacks:

- the operations are complicated and expensive, and they lack flexibility;
- it is practically impossible to have a large number of bobbins which have the same length; it is, therefore, necessary to effect knots or attachments upon the winding on the beam, which takes time and results in the formation of defects, or else no attachment is effected, but then there is a large amount of waste;
- the length of the assemblies varies on one in the same beam since it is practically impossible to deliver the same length from each bobbin.

It has been attempted to produce a ply of an assembly of threads and the winding of said ply on a beam on line but up to now this has been very difficult in practice since the defects coming from the threads or assemblies lead to the frequent stopping of the installation and the repair of these defects and the stopping and restarting of the installations lead to extensive waste, a decrease in the quality of the assemblies, and high costs and long periods of stoppage.

SUMMARY OF THE INVENTION

The object of the present invention is to overcome these drawbacks. Accordingly, the present invention relates to a method which makes possible the on-line production of a ply of assemblies of threads and the winding of this ply on a beam, the method being characterized by the following features:

a) a plurality of rotary devices is used, each of which permits the production of an assembly from a plurality of threads so as to obtain a ply of assemblies;

b) the assemblies are produced in such a manner that in transitory operation, that is to say, when the speed of rotation of each device varies in time between a value of zero and an arbitrary value corresponding to continuous operation, one has the relationship $$\frac{L1 - L2}{L} \leq \epsilon,$$

L1 being the length of the longest thread of the assembly and L2 being the length of the shortest thread of the assembly, L1 and L2 being determined for the arbitrary length L of the assembly produced by this device, and $\epsilon$ being an arbitrary value;

c) the ply of assemblies is driven along by pulling means common to all the assemblies;

d) means are used which, on the one hand, make it possible to synchronize the speeds of rotation of the devices with each other so as to have a common speed for these devices and, on the other hand, to synchronize the speed of the devices and the speed of the pulling means;

e) the ply of assemblies is wound on the beam;

f) means are used which make it possible to detect a possible defect on at least any one thread or at least any one assembly;

g) the production of the ply and the winding of the ply on the beam are interrupted when such a defect is detected, this interruption being effected in such a manner that, upon the interruption, the defect is located in front of the beam in the ply, seen in the direction of advance of the ply.

The invention also relates to an installation which makes possible the on-line production of a ply of assemblies of threads and the winding of this ply on a beam, the installation being characterized by the following features:

a) it comprises a plurality of rotary devices, each of which permits the production of an assembly from a plurality of threads so as to obtain a ply of assemblies;

b) each device is such that in transitory operation, that is to say, when the speed of rotation of this device varies in time between a value of zero and an arbitrary value corresponding to continuous operation of the installation, one has the relationship $$\frac{L1 - L2}{L} \leq \epsilon,$$

L1 being the length of the longest thread of the assembly and L2 being the length of the shortest thread of the assembly, L1 and L2 being determined for the arbitrary length L of the assembly produced by this device, and $\epsilon$ being an arbitrary value;

c) it comprises pulling means common to all the assemblies, permitting the driving of the ply of assemblies;
d) it comprises means which, on the one hand, make it possible to synchronize the speeds of rotation of the devices with each other so as to have a common speed for these devices and, on the other hand, to synchronize the speed of the devices and the speed of the pulling means;
e) it comprises a beam and means making it possible to wind the ply of assemblies on the beam;
f) it comprises means which make it possible to detect a possible defect on at least any one thread or at least any one assembly;
g) it comprises means making it possible to shut down the installation when such a defect is detected, the installation being so arranged that when the installation is thus shut down, the defect is located in front of the beam in the ply, as seen in the direction of advance of the ply.

The invention also relates to beams on which several assemblies are wound, these beams being obtained by this method or with this installation.

The embodiments which follow as well as the entirely diagrammatic figures of the drawing corresponding to these embodiments are intended to illustrate the invention and facilitate an understanding of it without, however, limiting its scope.

DESCRIPTION OF PREFERRED EMBODIMENTS

Figure 1:
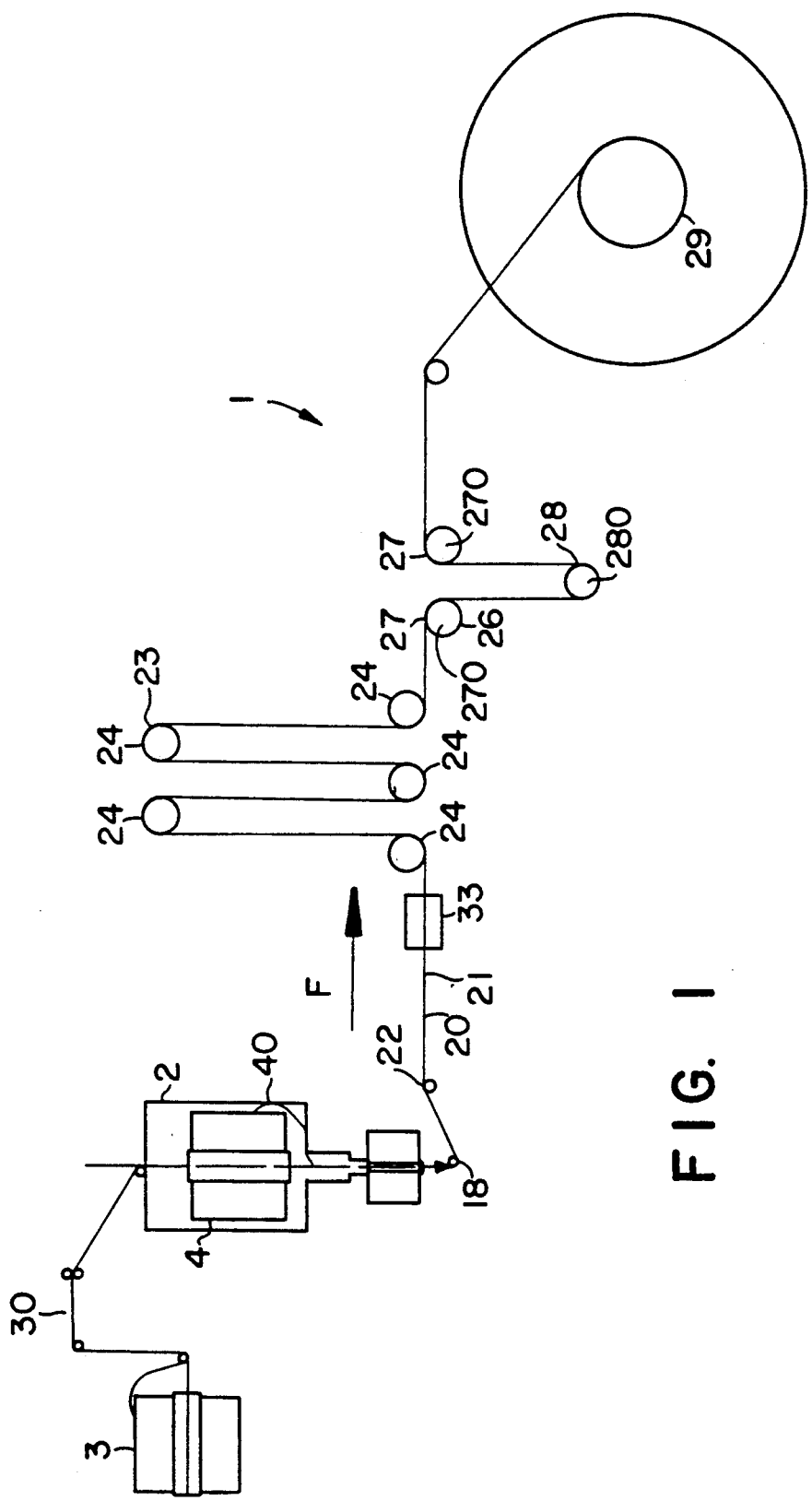
FIG. 1 is a schematic longitudinal section through an installation in accordance with the invention.
Figure 2:
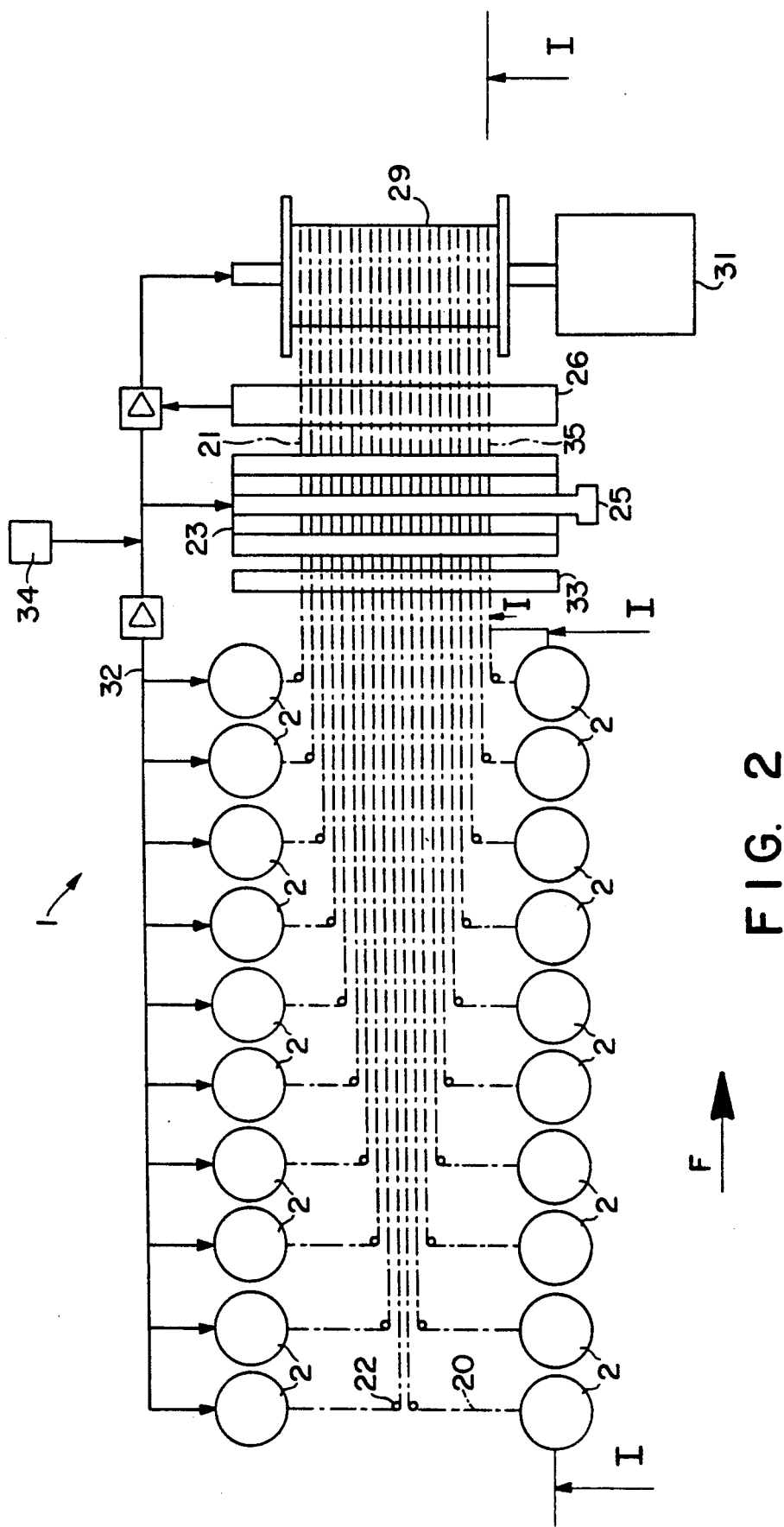
FIG. 2 is a top view of the installation shown in FIG. 1.

FIGS. 1 and 2 show an installation 1 in accordance with the invention, FIG. 1 being a longitudinal section and FIG. 2 a top view, the section in FIG. 1 being diagrammatically indicated by the straight line segments I—I in FIG. 2. The installation 1 comprises rotary devices 2, each permitting the production of one assembly from several threads.

Figure 3:
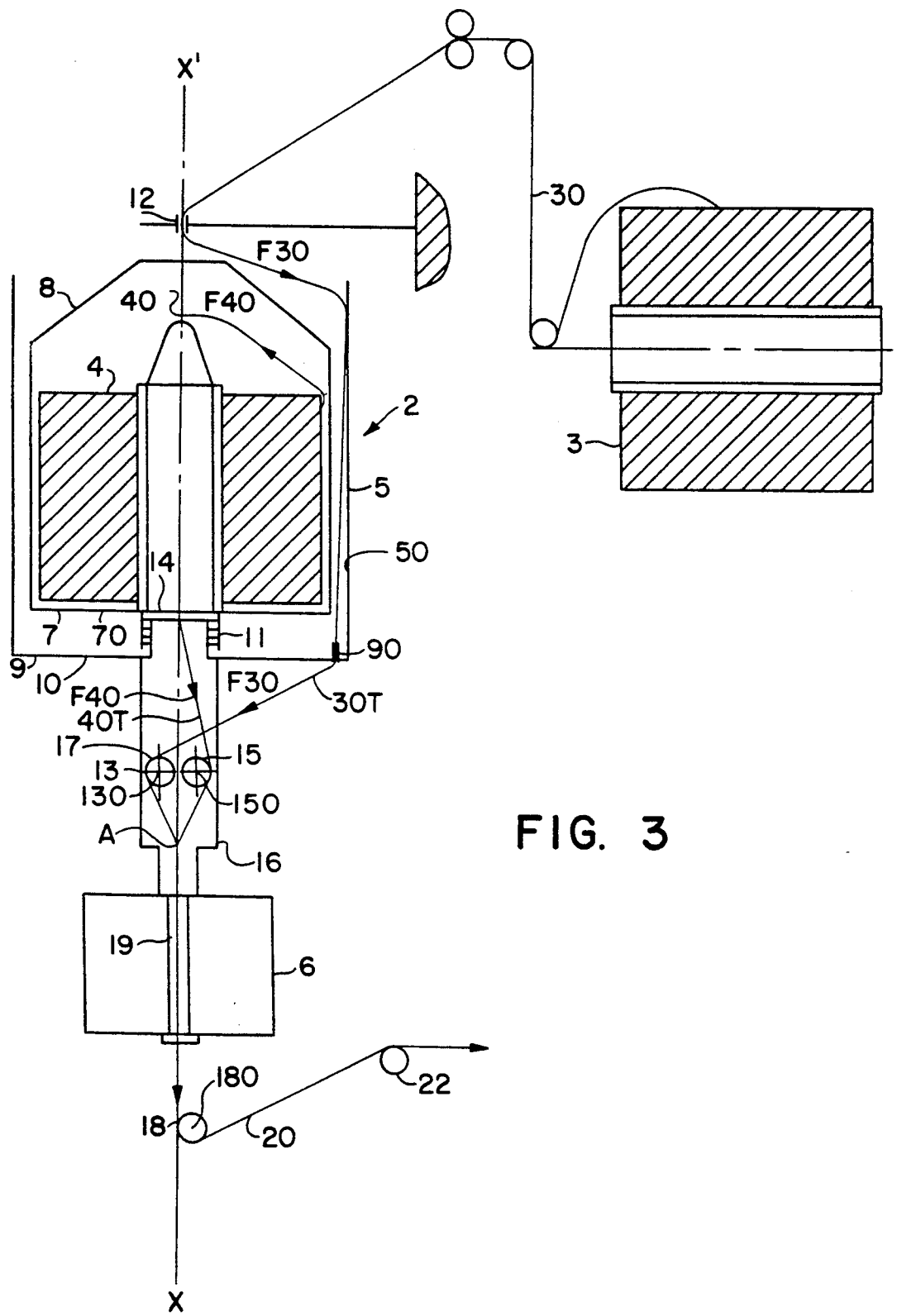
FIG. 3 shows a rotary device used in the installation shown in FIGS. 1 and 2, FIG. 3 being a section along the axis of rotation of this device.

By way of example, each of these devices 2 is in accordance with U.S. Pat. No. 4,689,942, issued Sep. 1, 1987, which is incorporated herein by reference. FIG. 3 shows one of these devices 2. This device 2 makes it possible, for instance, to produce a plied yarn from two threads which are untwisted multifilaments.

The device 2 comprises two bobbins 3 and 4 on each of which an untwisted multifilament thread is wound, the thread 30 being wound on the bobbin 3 and the thread 40 being wound on the bobbin 4. The device 2 comprises a drum 5 and a motor 6 which can drive the drum 5 in rotation around the axis xx', which is, for instance, vertical, FIG. 3 being a section along said axis.

The bobbin 3 is arranged on the outside of the drum 5 and the bobbin 4 is arranged on the inside of the drum 5, the bobbin 4 being arranged within a pot 7 provided with a cover 8, this pot 7 in its turn being arranged within the drum 5. The drum 5 is connected at its lower end to a plate 9 so as to form a bell-shaped enclosure 10 which turns around the axis xx'.

The bobbin 4 is immovable during the rotation of the drum 5, due to a bearing 11 which permits the rotation of the bell 10 without rotation of the pot 7 and, therefore, of the bobbin 4.

The thread 30 passes through an upstream guide 12 formed of a circular eye and then penetrates into the upper end of the drum 5. The thread 30 passes through the rum in downward direction and emerges from the drum 5 through the eye 90 arranged in the plate 9, then passing over a movable downstream guide 13 arranged outside the bell 10 and below it. Upon the rotation of the drum 5, the thread 30 driven by the centrifugal force, is applied against the inner face 50 of the drum 5, turning together with the drum 5 around the pot 7 and the bobbin 4, without there being contact between the thread 30, on the one hand, and the pot 7 and the bobbin 4 on the other hand. The thread 30 is thus subjected to a twist in the same direction as the rotation of the drum 5, between the guides 12 and 13, the thread 30 thus becoming a twisted multifilament 30T.

The thread 40 delivered by the bobbin 4 passes through an upstream guide 14 formed of a eye arranged in the bottom 70 of the pot 7; it then emerges from the drum 5 and passes over a movable downstream guide 15 arranged below the bell 10. Between the guides 14 and 15, the thread 40 is subjected to twist in the direction of rotation of the drum 5 in order to produce the twisted multifilament 40T. The displacements of the threads 30, 40 are diagrammatically indicated by the arrows F30, F40 in FIG. 3.

The downstream guides 13 and 15 are formed of rollers, the axles of rotation 130, 150 of which are firmly attached to a spindle 16 which itself is fastened to the bell 10 in driven rotation by the motor 6 at the same time as said bell at the same angular speed as the drum 5. The downstream guides 13, 15 are connected with each other by the threads 30, 40 and form a regulator system 17 driven in rotation by the motor 6 around the axis xx'.

The twisted multifilaments 30T, 40T emerging from the system 17 are then combined at the free point A on the axis xx' and passed over the roller 18, the axis 180 of which is stationary. The two threads 30T, 40T are, therefore, twisted between the point A and the roller 18, in view of the joint rotation of the rollers 13, 15 around the axis xx', this twist, referred to as "plying twist," being in a direction opposite to the rotation of the drum 5 and having an angular speed of rotation identical to that of the drum 5. The passage of the twisted multifilaments 30T, 40T between the point A and the roller 18 during their assembling takes place along the axis xx' within the drive cylinder 19, which is hollow. The assembly 20 thus obtained is a plied yarn. The other elements of the device 2, for instance the regulator systems for the threads 30, 40, are not described here for purposes of simplification.

By way of example, twenty devices 2 are used in the installation 1, the twenty assemblies 20 which come from these devices 2 forming a ply 21. For purposes of simplification of the drawing, a single device 2 is shown in FIG. 1, and the devices 2 have been diagrammatically indicated by circles in FIG. 2. For each device 2, a roller 22 arranged downstream of the roller 18 makes it possible to orient the plied yarn 20 in the direction of the ply 21 (FIGS. 2, 3). For simplicity, in FIG. 1 only one of these rollers 22 and only one assembly 20 have been provided with reference numbers from FIG. 2.

Each device 2 makes it possible to have a relatively high tension for the threads 30, 40 upon the starting or stopping of this device, as a result of the application of the thread 30 against the inner wall 50 of the drum 5 and therefore of the driving of the regulator system 17 by means of the motor 6 and not by the threads 30, 40. It follows from this that the inertia of the regulator systems 17 and of the devices 2 together is slight and the devices 2 permit rapid accelerations and decelerations. Under these conditions, in transitory operation, that is to say, when the speed of rotation of each device 2 varies in time, upon interruptions or replacings in operation of this device, between a speed of zero corresponding to the interruption and an arbitrary value corresponding to continuous operation, one has for each device 2 the relationship $$\frac{L1 - L2}{L} \leq \epsilon,$$

L1 being the length of the longest thread or the assembly 20 and L2 being the length of the shortest thread of the assembly 20, L1 and L2 being determined for the arbitrary length L (for instance 50 cm) of assembly 20 produced by this device 2, $\epsilon$ (assembly ratio) having an arbitrary value. The measurement of L, L1 and L2 is effected in the following manner: The threads of the assembly 20, which has the length L, are separated; each of these threads is untwisted and L1 and L2 are measured on these untwisted threads, the measurements of L, L1 and L2 being effected under a standard tension which corresponds to the weight of 500 meters of the assembly (in the case of L) and of 500 meters of thread (in the case of L1 and L2).

The quality of the assembly 20 will be better the smaller $\epsilon$ is, $\epsilon$ being preferably at most equal to 5% and advantageously at most equal to 2%.

The installation 1 does not have an individual winder and pulling capstan for each device 2. On the contrary, all of the assemblies 20, that is to say, the ply 21 coming from the devices 2 after passage over the rollers 22 are placed in movement together by one pulling device 23 formed of several cylinders 24, for instance five, the rotation of which is obtained by the motor 25 so as to drive the ply 21.

The direction of advance of the ply 21 in the longitudinal direction is indicated by the arrow F. The ply 21 then passes over a compensator 26 which is formed of two rollers 27 with fixed axes 270 and one roller 28 the axis 280 of which can move vertically (FIG. 1). The position of the roller 28 makes it possible to adjust the speed of the beam 29 arranged downstream of the compensator 26.

For purposes of simplification of the drawing, the devices 23 and 26 have been indicated diagrammatically by rectangles in FIG. 2.

The ply 21 is then wound on the beam 29, the rotation of which is effected by the motor 31, said operation corresponding to a warping.

The synchronization means 32 make it possible, on the one hand, to synchronize the speeds of rotation of the devices 2 with each other so as to have a common speed of rotation for these devices and furthermore to synchronize this common speed of the devices 2 with the linear speed of travel of the ply 21, that is to say, the speed of the pulling device 23.

These means 32 are known per se and can, in particular, be mechanical means, for instance means employing belts or transmission shafts, or electrical means.

The installation 1, furthermore, comprises means 33 which make it possible to detect a possible defect, for instance a break, in the case of any of the assemblies 20 or of the threads constituting said assemblies, and a known device 34, for instance, an electric control, making it possible to stop the devices 2, 23 as well as the motor 31 when such a defect is detected. These means 33, which are known per se, may consist, for instance, of electrical detectors. This stopping is effected in such a manner that the defect 35 is located in the ply 21 before winding on the beam 29, when the installation 1 is stopped (FIG. 2). After the stopping of the installation, the defect 35 is repaired, for instance by bringing a known repair device, in particular a device making it possible to reattach threads, into contact with the assembly 20 at the point where the defect 35 is. When the defect 35 is repaired, the installation is started in operation again by the device 34.

It is possible to stop and restart the installation 1 rapidly without decrease in quality of the assemblies 20 upon this transitory period of stopping and restarting, since all the devices 2 give assemblies 20 which satisfy the above-indicated relationship $$\frac{L1 - L2}{L} \leq \epsilon.$$

Therefore, waste upon these stoppings and restartings is avoided or eliminated to a large extent.

The installation 1 according to the invention has the following advantages:

- Both the production of the assemblies 20 and the winding of a large number of these assemblies on the beam 29 are effected continuously on-line, without passing through an intermediate winding stage, which substantially reduces production costs and time;
- The pulling device 23 drives along as a unit the entire ply 21 so that all the assemblies 20 have the same linear speed, which assures great homogeneity of the characteristics of these assemblies, this all the more so as the synchronization device 32 makes it possible to guarantee that all the assemblies 20 are made uniformly with the same twist;
- The pulling device 23 makes it possible to separate the tensions necessary for the twisting from the tensions necessary for the winding of the beam, which permits a finer adjustment of these tensions and therefore further favors homogeneity of the characteristics of the assemblies;
- By controlling the synchronization between the speed of rotation of the devices 2 and the linear speed due to the pulling device 23, assemblies 20, the twist of which can be selected as desired, can easily be produced;
- The number of assemblies 20 on the beam 29 can easily be varied by stopping a given number of devices 2 in order to have the desired number of these devices;
- For a given operation, the beam 29 has the same length for all the assemblies 20 present there, which length may be selected as desired; one, therefore, avoids tied knots in the assemblies and the defects due to these knots.

The installation 1 is therefore simple, flexible and economical, this, in particular, as the waste is considerably limited as compared with known installations.

Furthermore, it is possible to insert within the line of this installation known devices which make it possible to treat the assemblies 20, for instance in order to impregnate them with resins, which further increases the flexibility of this installation.

Other types of devices 2 than the one described can be used in the installation 1, provided that the relationship $$\frac{L1 - L2}{L} \leq \epsilon,$$

is satisfied.

By way of example, the installation 1 is used to obtain a beam the characteristics of which are as follows:
Number of assemblies 20 on the beam 29: 100;
Weight of all these assemblies 20 on the beam 29: 1 ton;
Characteristics of each assembly 20:
 aramid threads;
 plied yarns of two threads, each thread having a linear density of 167 dTex;
 twist of the assembly: 300 to 400 turns per meter, S;
 elongation of the assembly upon rupture: 3.1%;
 rupture force of the assembly: 647 N;
 value of $\epsilon$ less than 1%.

This beam is obtained practically without waste and without tying and, furthermore, all these assemblies 20 have the same length on the beam since the installation 1 assures uniform tension and uniform length of the assemblies.

By way of comparison, such a beam of 100 assemblies identical to the proceeding ones, produced in known manner from bobbins of 3 kg requires more than 300 knots, which takes time and causes the formation of many defects. If this beam is produced with bobbins of 10 kg, knots are avoided if the warping is stopped at the end of the shortest bobbin, but one has a substantial amount of waste at the end of warping as a result of the inevitable differences in lengths of bobbin since thread remains on the other bobbins.

On the other hand, in all cases, the assemblies 20 have variable lengths on the beam, since these lengths depend on the geometry of the beam and the tensions upon departure from each bobbin, which is practically impossible to control.

The invention has been described in preferred form and by way of example and is not intended to be limited to the embodiments described above.

I claim:

1. A method permitting the on-line production of a ply of thread assemblies and the winding of said ply on a beam, the method comprising:
 a. producing a ply of assemblies using a plurality of rotary devices, each of which permits the production of an assembly from a plurality of threads combined by twisting at least one of the threads, the assemblies being produced such that in transitory operation, that is to say, when the speed of rotation of each device varies in time between a value of zero and a value corresponding to continuous operation, the relationship $$\frac{L1 - L2}{L} \leq \epsilon$$

is satisfied, L1 being the length of the longest thread of the assembly and L2 being the length of the shortest thread of the assembly, L1 and L2 being determined in untwisted condition and under tension for an arbitrary length L of the assembly produced by this device, L being determined in twisted condition under tension, L1 and L2 being measured under a tension which corresponds tot he weight of 500 meters of the thread and L being measured under a tension which corresponds to the weight of 500 meters of the assembly, and $\epsilon$ being at most 5%;
 b. driving the ply of assemblies by pulling means which are common to all the assemblies and act thereon upstream of the beam to help implement the said relationship;
 c. synchronizing the speeds of rotation of the devices with each other so as to have a common speed for these devices and synchronizing the speeds of the devices and the speed of the pulling means;
 d. winding the ply of assemblies on the beam;
 e. detecting a possible defect on at least any one thread or at least any one assembly; and
 f. stopping the production of the ply and the winding of the ply on the beam when such a defect is detected, this stopping being effected in such a manner that upon the stopping the defect is located in the ply in advance of the beam.

2. A method according to claim 1 in which $\epsilon$ is at most equal to 2%.

3. An installation permitting the on-line production of a ply of assemblies of threads and the winding of this ply on a beam, the installation comprising:
 a. plurality of rotary devices each of which permits the production of an assembly from a plurality of threads so as to obtain a ply of assemblies, each device in its transitory operation, that is to say, when the speed of rotation of this device varies in time between a value of zero and a value corresponding to the continuous operation of the installation, satisfying the relationship $$\frac{L1 - L2}{L} \leq \epsilon,$$

L1 being the length of the longest thread of the assembly and L2 being the length of the shortest thread of the assembly, L1 and L2 being determined in untwisted condition and under tension for an arbitrary length L of the assembly produced by this device, L being determined in twisted condition under tension, L1 and L2 being measured under a tension which corresponds to the weight of 500 meters of the thread and L being measured under a tension which corresponds to the weight of 500 meters of the assembly, and $\epsilon$ being at most 5%;
 b. pulling means common to all the assemblies which maintain the assemblies under tension and help implement the said relationship while advancing the ply of assemblies;
 c. means synchronizing the speeds of rotation of the devices with each other, so as to have a common speed for these devices, and the speeds of the devices and the speed of the pulling means;

d. a beam downstream of the pulling means and means making it possible to wind the ply of assemblies on the beam;
e. means for detecting a possible defect in at least any one thread or at least any one assembly;
f. means for stopping the installation when such a defect is detected, the installation being so arranged that when the installation is thus stopped, the defect is located in the ply in advance of the beam.

4. An installation according to claim 3 in which $\epsilon$ is equal to at most 25%;

* * * * *

UNITED STATES PATENT AND TRADEMARK OFFICE
CERTIFICATE OF CORRECTION

PATENT NO. : 5,295,287
DATED : Mar. 22, 1994
INVENTOR(S) : Chateau

It is certified that error appears in the above-indentified patent and that said Letters Patent is hereby corrected as shown below:

Title page, Item 75, "Fernard" should read --Fernand--.
Col. 4, line 8, "rum" should read --drum--.
Col. 5, line 21, "or the" should read --of the--.
Col. 8, line 12, "tot he" should read --to the--.
Col. 8, line 38, "a. plurality" should read --a. a plurality--.
Col. 10, line 6, "25%" should read --2%--.

Signed and Sealed this

Sixth Day of September, 1994

Attest:

Attesting Officer

BRUCE LEHMAN

Commissioner of Patents and Trademarks